United States Patent
Basham et al.

(10) Patent No.: US 7,676,702 B2
(45) Date of Patent: Mar. 9, 2010

(54) PREEMPTIVE DATA PROTECTION FOR COPY SERVICES IN STORAGE SYSTEMS AND APPLICATIONS

(75) Inventors: Robert Beverley Basham, Aloha, OR (US); Andrew W. Grimes, Tucson, AZ (US); Nikhil Khandelwal, Tucson, AZ (US); Michael M. Latif, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 11/464,320

(22) Filed: Aug. 14, 2006

(65) Prior Publication Data

US 2008/0126857 A1  May 29, 2008

(51) Int. Cl.
*G06F 11/00* (2006.01)
(52) U.S. Cl. .................. 714/47; 709/224; 711/162
(58) Field of Classification Search .............. 714/47; 709/224; 711/162
See application file for complete search history.

(56) References Cited

U.S. PATENT DOCUMENTS

| | | | |
|---|---|---|---|
| 5,463,768 A | 10/1995 | Cuddihy et al. | |
| 5,485,573 A | 1/1996 | Tandon | |
| 5,555,389 A | 9/1996 | Satoh et al. | |
| 5,619,644 A | 4/1997 | Crockett et al. | |
| 5,740,357 A | 4/1998 | Gardiner et al. | |
| 5,761,212 A | 6/1998 | Foland, Jr. et al. | |
| 6,101,588 A | 8/2000 | Farley | |
| 6,148,414 A | 11/2000 | Brown et al. | |
| 6,199,104 B1 | 3/2001 | Delph | |
| 6,223,544 B1 | 5/2001 | Seem | |
| 6,247,103 B1 | 6/2001 | Kern et al. | |
| 6,345,369 B1 | 2/2002 | Kitamorn et al. | |
| 6,643,802 B1 | 11/2003 | Frost et al. | |

(Continued)

FOREIGN PATENT DOCUMENTS

GB  2405501 A  3/2005

(Continued)

OTHER PUBLICATIONS

Bancroft et al., "Functionality and Performance Evaluation of File Systems for Storage Area Networks (SAN)", IEEE Symposium on Mass Storage Systems, 2000, pp. 101-119.

(Continued)

*Primary Examiner*—Philip Guyton
(74) *Attorney, Agent, or Firm*—Stephen R. Tkacs; Stephen J. Walder, Jr.; Randall J. Bluestone (57) ABSTRACT

A common interface and communication methodology are provided for interaction between the components of a storage area network for them to activate "triggers" that cause actions to be taken by the devices to utilize copy service functions to create additional copies of data, and to potentially route load to other resources. The actions can be taken by any of the elements of the storage area network to mitigate the impact of the pending failure. The advantage of this system over current methods is that it can detect both failure and impending failure in any component in the system and use resources in any other component to mitigate the failure. This creates a much more comprehensive recovery strategy and the potential to save more data than in current systems.

17 Claims, 7 Drawing Sheets

U.S. PATENT DOCUMENTS

| | | | |
|---|---|---|---|
| 6,769,071 | B1 | 7/2004 | Cheng et al. |
| 6,772,290 | B1 | 8/2004 | Bromley et al. |
| 6,802,020 | B1 * | 10/2004 | Smith ........................... 714/4 |
| 6,880,101 | B2 | 4/2005 | Golasky et al. |
| 6,948,102 | B2 * | 9/2005 | Smith ......................... 714/47 |
| 7,003,702 | B2 | 2/2006 | Budd et al. |
| 7,032,019 | B1 | 4/2006 | Noguchi et al. |
| 7,120,832 | B2 * | 10/2006 | Collins et al. ................ 714/42 |
| 7,210,071 | B2 | 4/2007 | Deacon et al. |
| 7,240,234 | B2 * | 7/2007 | Morita et al. .................. 714/4 |
| 7,370,241 | B2 * | 5/2008 | Nicholson et al. ............. 714/47 |
| 7,409,594 | B2 * | 8/2008 | Mukherjee et al. ............ 714/26 |
| 2003/0061331 | A1 | 3/2003 | Nakamura et al. |
| 2003/0079074 | A1 | 4/2003 | Sicola et al. |
| 2003/0120751 | A1 | 6/2003 | Husain et al. |
| 2003/0140278 | A1 | 7/2003 | Holland et al. |
| 2003/0140299 | A1 | 7/2003 | Duncan et al. |
| 2003/0221155 | A1 | 11/2003 | Weibel et al. |
| 2004/0015722 | A1 | 1/2004 | Klotz et al. |
| 2004/0047354 | A1 | 3/2004 | Slater et al. |
| 2004/0139168 | A1 | 7/2004 | Tanaka et al. |
| 2004/0153728 | A1 * | 8/2004 | Suzuki et al. .................. 714/6 |
| 2004/0225926 | A1 | 11/2004 | Scales et al. |
| 2004/0243796 | A1 | 12/2004 | Keohane et al. |
| 2005/0015647 | A1 | 1/2005 | Okada et al. |
| 2005/0015685 | A1 | 1/2005 | Yamamoto |
| 2005/0022064 | A1 | 1/2005 | Steinmetz et al. |
| 2005/0044162 | A1 | 2/2005 | Liang et al. |
| 2005/0081080 | A1 | 4/2005 | Bender et al. |
| 2005/0166084 | A1 | 7/2005 | Yagisawa et al. |
| 2005/0216800 | A1 * | 9/2005 | Bicknell et al. ............. 714/718 |
| 2006/0080430 | A1 | 4/2006 | Barsuk |
| 2006/0107129 | A1 | 5/2006 | Franklin et al. |
| 2006/0129759 | A1 | 6/2006 | Bartlett et al. |
| 2006/0168471 | A1 | 7/2006 | Schulstad |
| 2008/0178048 | A1 | 7/2008 | Balazich et al. |
| 2008/0244331 | A1 | 10/2008 | Grimes et al. |

FOREIGN PATENT DOCUMENTS

| | | |
|---|---|---|
| JP | 55-108064 | 8/1980 |
| WO | WO 2006/053898 A2 | 5/2006 |

OTHER PUBLICATIONS

J. Menon et al., "IBM Storage Tank—A heterogeneous scalable SAN file system", IBM Systems Journal, vol. 42, No. 2, 2003, pp. 250-267.

Mesnier et al., "Storage Area Networking—Object-Based Storage", IEEE Communications Magazine, vol. 41, No. 8, Aug. 2003, pp. 84-90.

Agrawal et al., "Policy-Based Validation of SAN Configuration", Proceedings of the Fifth IEEE International Workshop on Policies for Distributed Systems and Networks, 2004, 10 pages.

U.S. Appl. No. 11/692,223, filed Mar. 28, 2007, Grimes et al.

U.S. Appl. No. 11/766,492, filed Jun. 21, 2007, Brown et al.

Wang et al., "A High Density Two Dimensional Bar Code", Proceedings of the SPIE vol. 1384 High-Speed Inspection Architectures, Barcoding, and Character Recognition (1990), Nov. 5-7, 1990, pp. 169-175.

Barcaroli, G., "An Integrated System for Edit and Imputation of Data in the Italian National Statistical Insitute", Survey and Statistical Computing, Sep. 24-26, 1992, pp. 167-177.

"Execution Time Dynamic Data Collection at First Detection of Failure", IBM Corporation, Technical Disclosure Bulletin, TDB v.37 n6B, Jun. 1994, pp. 391-392.

Clark, Tom, "A Management Strategy for Fibre Channel-Arbitrated Loop", Internet Citation, [Online] XP002979440, http://www.networkbuyersguide.com/search/309003.htm, Mar. 1998, 10 pages.

* cited by examiner

FIG. 9 ically, the
present application is directed to a preemptive data protection
PREEMPTIVE DATA PROTECTION FOR COPY SERVICES IN STORAGE SYSTEMS AND APPLICATIONS

BACKGROUND

1. Technical Field

The present application relates generally to an improved data processing system and method. More specifically, the present application is directed to a preemptive data protection for copy services in storage systems, service systems, and application architecture.

2. Description of Related Art

A storage area network (SAN) is a network of storage disks. In large enterprises, a SAN connects multiple servers to a centralized pool of storage systems. Compared to managing hundreds of servers, each with its own disks, SANs improve system administration. By treating all of a company's storage as a single resource, disk maintenance and routine backups are easier to schedule and control.

Storage area networks, as well as other network data processing systems, include multiple layers, such as applications, database applications, file systems, host server systems, network infrastructure, and storage systems. Current implementations keep these layers abstract, but include redundancy within each layer for fault tolerance.

In some SANs, the storage systems themselves can copy data to other storage systems for backup without any processing overhead at the host systems. In computer systems with two or more storage systems, peer to peer remote copy (PPRC) allows one storage system to mirror a volume on a second storage system. Synchronous PPRC causes each write to the primary volume to be performed to the secondary volume as well. The input/output (I/O) operation is only considered complete when update to both the primary and the secondary volumes have completed. Asynchronous PPRC flags tracks on the primary volume to be duplicated to the secondary volume when time permits.

SUMMARY

In one illustrative embodiment, a computer program product is provided comprising a computer recordable medium having a computer readable program. The computer readable program, when executed within a first component within a plurality of components of a storage area network, causes the first component to receive a status message from a second component within the plurality of components of the storage area network through a plurality of levels of the storage area network. The status message reports a pending failure. Responsive to receiving the status message at the first component, the computer readable program may also cause the first component to determine a mitigating action to be performed by the first component, perform the mitigating action at the first component, and report the mitigating action to the plurality of components.

In another illustrative embodiment, an apparatus is provided in a first component within a plurality of components of a storage area network. The apparatus comprises a processor and a memory coupled to the processor. The memory contains instructions which, when executed by the processor, cause the processor to receive a status message from a second component within the plurality of components of the storage area network through a plurality of levels of the storage area network. The status message reports the pending failure. Responsive to receiving the status message at the first component, the instructions further cause the processor to determine a mitigating action to be performed by the first component and perform the mitigating action at the first component. The first component is a storage device component. The mitigating action corn rises forcing an asynchronous peer-to-peer remote copy or converting an asynchronous peer-to-peer remote cony to synchronous.

In a still further illustrative embodiment, a method is provided for detecting pending failures and performing mitigating actions a first component within a plurality of components of a storage area network. The method comprises receiving a status message from a second component within the plurality of components of the storage area network through a plurality of levels of the storage area network. The status message reports the pending failure. The method further comprises responsive to receiving the status message at the first component, determining a mitigating action to be performed by the first component and performing the mitigating action at the first component. The method further comprises reporting the mitigating action to a user with relevant information. The mitigating action comprises a peer-to-peer remote copy. The relevant information comprises time, date, and backup copy location.

In another illustrative embodiment, a method is provided for providing a data protection and copy service in a storage area network. The method comprises configuring a first component within a plurality of components of the storage area network to detect a pending failure in the first component and to send a first status message from the first component to one or more of the plurality of other components through a plurality of levels of the storage area network. The first status message reports the pending failure. The method further comprises configuring the first component to determine a mitigating action to be performed by the first component responsive to receiving a second status message from a second component within the plurality of components of the storage area network, to perform the mitigating action at the first component, and to report the mitigating action to the plurality of components.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
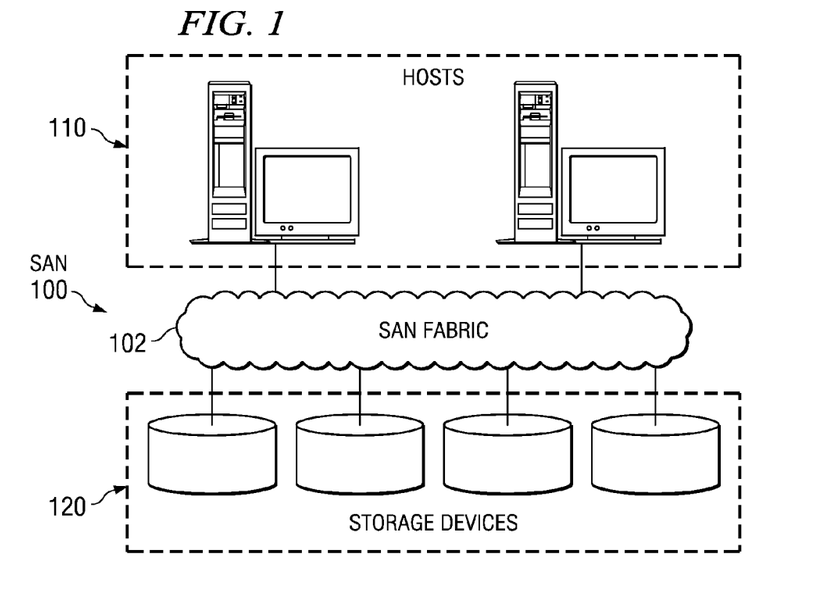
FIG. 1 depicts a pictorial representation of a storage area network in which aspects of the illustrative embodiments may be implemented.
Figure 2:
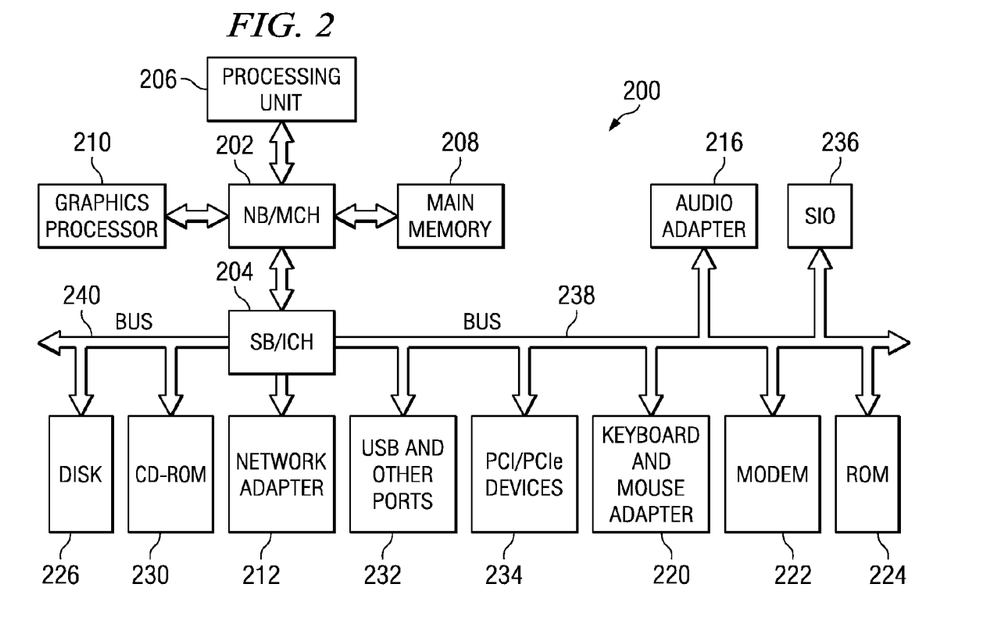
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a storage area network in which aspects of the illustrative embodiments may be implemented. Storage area network (SAN) 100 contains SAN fabric 102, which is a combination of interconnected switches, which collectively provide a routing infrastructure within SAN 100.

In the depicted example, hosts 110 are connected to fabric 102 along with storage systems 120. Hosts 110 may be, for example, personal computers, network computers, servers, or the like. In the depicted example, hosts 110 access storage systems 120 through paths in the SAN fabric. SAN 100 may include additional hosts and/or other storage devices not shown. FIG. 1 is intended as an example, and not as an architectural limitation for the present invention.

SAN fabric 102 is the medium used to provide communication links between various devices and computers connected together within SAN 100. SAN fabric 102 may include connections, such as wire, wireless communication links, or fiber optic cables. In one embodiment, SAN fabric 102 may represent a collection of networks and gateways that use the Transmission Control Protocol/Internet Protocol (TCP/IP) suite of protocols to communicate with one another. Of course, SAN fabric 100 may also be implemented to include a number of different types of networks, such as for example, fibre channel, Ethernet, serial attached small computer systems interface (serial attached SCSI or SAS), or the like. In fact, many current SANs use fibre channel for data transfer and Ethernet for communications of management information.

There is a tendency for components of a storage system to fail in a cascading manner. Frequently a storage system will not outright fail and lose data. Rather, it will start to have problems with redundant components that start to cascade a failure through a system. This tends to provide some warning of an impending data loss/loss of access scenario. In accordance with the exemplary embodiments, a mechanism is provided for communicating the initial indications of a cascading failure to the various layers of a storage area network. The storage area network includes the storage devices, network infrastructure, host systems, and applications running on the hosts.

In the current SAN industry, there is no direct way for storage devices, switches, routers, hosts, and host applications to communicate system status to each other. It would be beneficial for data preservation and availability if there was a mechanism for communicating degraded and impending component failure to the other elements of the storage area network through the application stack to allow for preventive and mitigating actions to be taken to prevent or reduce data loss in failure scenarios by multiple components in the stack.

In one exemplary embodiment, the storage system, network infrastructure, host system, and host application have the ability to communicate directly with each other status messages that may be used to provoke actions to be taken to preempt data loss/loss of access scenarios before they occur during early phases of system failure. A common interface and communication methodology are provided for interaction between the components of a storage area network for them to activate "triggers" that cause actions to be taken by the devices to utilize copy service functions to create additional copies of data, and to potentially route load to other resources. The actions can be taken by any of the elements of the storage area network to mitigate the impact of the pending failure. The advantage of this system over current methods is that it can detect both failure and impending failure in any component in the system and use resources in any other component to mitigate the failure. This creates a much more comprehensive recovery strategy and the potential to save more data than in current systems.

As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows XP® (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer® pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
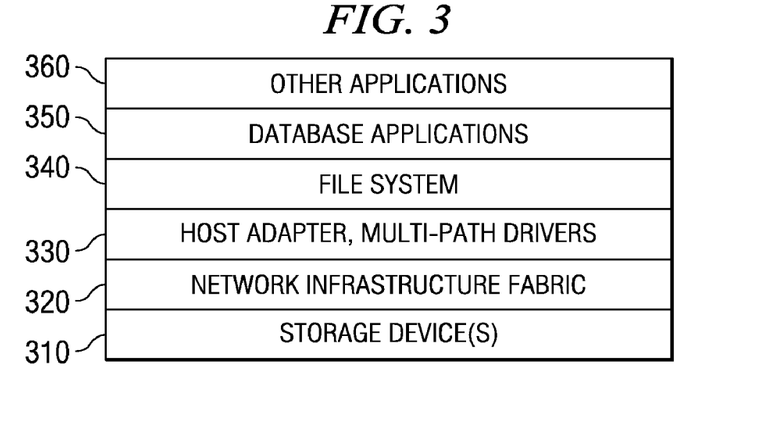
FIG. 3 is a block diagram illustrating the functional layers of a storage area network in accordance with an illustrative embodiment.

FIG. 3 is a block diagram illustrating the functional layers of a storage area network in accordance with an illustrative embodiment. The "bottom" layer is the storage device(s) 310. A storage device may be, for example, a direct access disk or a storage system, such as a redundant array of independent disks (RAID) subsystem. A storage system may comprise a plurality of physical disks in an enclosure.

On top of the storage devices layer 310 is the network infrastructure fabric 320. The network infrastructure fabric comprises the switches and/or routers that make up the communications components through which the host systems communicate with the storage devices. The network infrastructure fabric may comprise channel adapters or storage controllers that interface the storage devices and host systems; however, in an alternative embodiment, the channel adapters or storage controllers may be considered components of the storage devices and host systems themselves.

Host adapter and multi-path drivers 330 make up the layer on top of network infrastructure fabric layer 320. The host adapter is the physical hardware used at the host system to communicate with the network infrastructure. Multi-path drivers are software drivers used by the host system to select paths through the network infrastructure to communicate with certain targets. The network infrastructure is typically made up of several, perhaps many switches and/or routers. The manner the switches and/or routers are connected results in a web or array of devices. As a result, there may be multiple redundant paths from a source, such as a host adapter, to a target, such as a storage device. The multi-path drivers manage these paths for load balancing, reliability, and fault tolerance.

The layer above the host adapter and multi-path drivers 330 is file system layer 340. A file system is a component for storing, retrieving, and managing files. A file system defines the directory structure for keeping track of the files and the path syntax required to access them. It also defines the way files are named as well as the maximum size of a file or volume. FAT, FAT32, and NTFS are examples of file systems. Some operating systems support several file systems.

On top of file system layer 340 is database applications layer 350. A database is a set of related files that is created and managed by a database management system (DBMS). The database applications layer 350 comprises a DBMS, which represents data to applications in an organized manner. For example, database applications layer 350 may be configured to represent data as flat files, records, tables, vectors, multimedia formats, etc. Note, however, that while some databases talk through a file system; other databases may talk directly without the need of a file system.

The next layer is application layer 360. An application is a set of files that make up software for the user. Application layer 360 is responsible for doing the actual work requested by the user. Application layer 360 may also provide a visual interface for the user. For example, an application in application layer 360 may provide a front end to database applications 350.

In current storage area networks, the functional layers are kept abstract. Typically, failures and loss of data situations are dealt with within each layer. However, there is still a risk exposed, particularly that of cascading errors from one layer to the next. In addition to the stack, there is storage management software that manages most of the stack as a system (all but the file system and the application layer). Storage management software is centralized.

In accordance with an illustrative embodiment, a mechanism is provided to introduce reliability across the system using a set of services used to monitor and configure storage to ensure the greatest data protection available by reacting to the storage system, storage network, and application health status to avoid or at least mitigate data loss scenarios. The system may perform these tasks through web services and application program interfaces (APIs) that work across a distributed system. This allows for dynamic optimization of data redundancy by monitoring and acting on changes at multiple points in the system.

A mechanism is provided for communicating product status to an application to trigger responses and mitigation activity prior to failure scenarios. The system uses an API between the storage device and the attached host system to communicate the condition of the storage relationship. The system may use a policy and algorithm to select and then execute appropriate responses within a host/storage system to prevent or mitigate data loss from component failure or component degradation that can preempt a full system failure.

Figure 4:
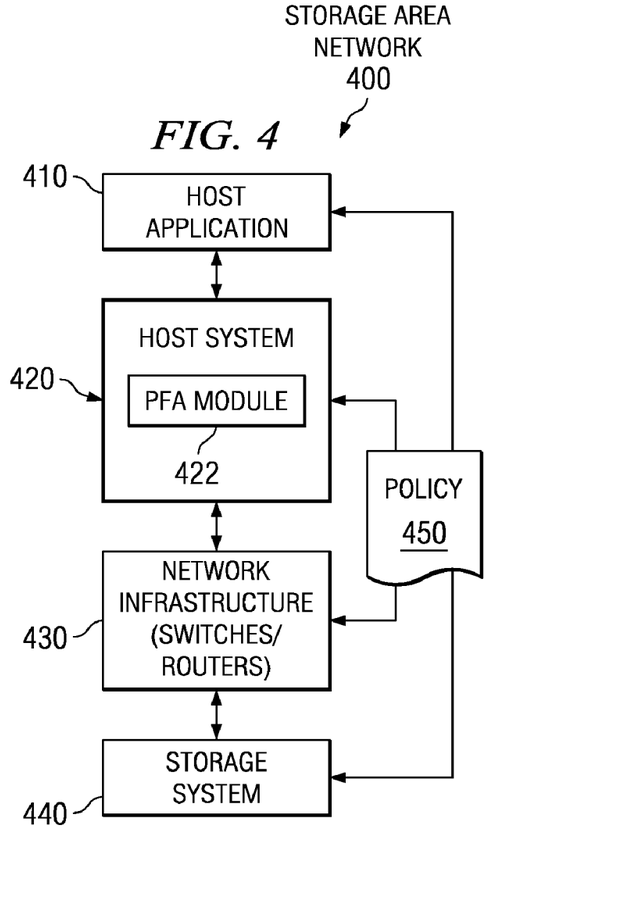
FIG. 4 is a diagram depicting a storage area network in accordance with an illustrative embodiment.

FIG. 4 is a diagram depicting a storage area network in accordance with an illustrative embodiment. Storage area network 400 includes a host side, which includes host application 410 and host system 420, and a storage side, which includes storage system 440. The host side may also include a host bus adapter (not shown), which may alternatively be considered part of network infrastructure 430. The storage side may also include communications hardware within storage system 440, which may alternatively be considered part of network infrastructure 430. Host application 410 runs on host system 420. Host system 420 may read data from and write data to storage system 440 through network infrastructure 430.

Network infrastructure 430 includes communications components that facilitate communication between the host side and the storage side. For instance, network infrastructure 430 may include Ethernet routers, fibre channel switches, and the like.

In accordance with an illustrative embodiment, components within storage area network 400 communicate status messages to other components, even across functional layers. For example, host application 410 may send status messages to host system 420. Components within network infrastructure 430 may send status messages to host system 420. Storage system 440 may send status messages to host system 420 through network infrastructure 430. The components may communicate status messages through a common interface. An example of a standard interface for communicating management information up and down the stack through Ethernet (the functional layers) is common information model (CIM), although other interfaces may be used without departing from the spirit and scope of the illustrative embodiments.

Components within storage area network 400 also include microcode for performing particular actions responsive to "triggers." These actions allow the components of SAN 400 to mitigate the impact of a pending failure, or perhaps an actual failure. These actions may be taken within any component in SAN 400. Thus, through the messaging and mitigating actions, the components of SAN 400 may detect both failure and impending failure and use resources in any other component to mitigate the failure and prevent cascading failure. This provides a much more comprehensive recovery strategy and the potential to save more data than in current systems.

Components in SAN 400 may use policy 450 to determine the actions to take responsive to certain triggers. Policy 450 may be a text file in a markup language, such as XML for instance. When a component receives a status message from another component in SAN 400, the component determines whether the status message triggers a mitigating action based on policy 450.

Host system 420 may execute predictive failure analysis (PFA) 422. Predictive failure analysis (PFA) is a specification for monitoring the performance of certain hardware, such as hard disk drives or power supplies, which can generate alerts about imminent features and enable action to protect critical data and equipment. General emphasis is on algorithms and policies for using non-failure clues to predict future failure of a component and to take action before the failure actually occurs.

In a degradation case, the host side may dynamically allocate additional cache for write caching to the degraded system to reduce actual load to the storage unit itself (and the disk behind it). If the data is redundantly located elsewhere and that location is not degraded, the host side may switch to the redundant location, which is good for read-only type applications like, for example, some web servers. The storage side may delay non-essential tasks until the period of degradation is complete.

Host side triggers may include, for example, impending host component failure (host bus adapter (HBA), hard disk drive (HDD) on server, power supply, etc.), host application detected data inconsistency (unexpected/corrupt data, lack of response, failed write/read), predictive failure analysis (PFA) indications of an impending failure. Predictive failure analysis is a predictive analysis of system variables to detect impending failure. Host side responses may include, for example, flush cache and disable write caching on the host itself, force volumes read-only, force a file system into a "safe-mode" that minimizes corruption in case of storage loss, begin a failover to another server/storage that is not exposed.

Storage side triggers may include, for example, PFA analysis indications of a pending failure, disk drive module (DDM) failure, storage component failure, impending storage failure, impending host component failure, or high risk business scenario. Storage side responses may include, for example, force an asynchronous peer-to-peer remote copy (PPRC) to create an additional data copy or convert asynchronous PPRC to synchronous to reduce data loss.

As an example scenario of a system response, the notification of inconsistency or degraded hardware by the storage system may cause the host to respond by flushing cache and force a point in time copy/remote copy to be created on the storage device. As another example, the notification of an application detected inconsistency in data may force a point in time copy or asynchronous copy of the last consistency group (last known good data point) prior to the application inconsistency detection. As a further example, a network detected inconsistency may provoke the storage system to create a point in time copy at the time of the incident on storage to backup data. A message is passed to the application that a failure is detected to see if an additional mitigation response is required. For all of these examples, a policy may be provided for responses to tailor the reaction to environment, extra storage availability, and user preferences. The remote activation automation handles scripting to force specific copies at critical business times.

Thus, the illustrative embodiments provide a protocol and methodology for a system to communicate and administer via in-band communication status messages and actions between storage devices, network components, host systems, and host applications. In-band generally means commands or activities that are in the data traffic connection. Often in systems, there are separate "channels" for command controls and for data traffic (Ethernet for Web browsers and fibre channel for data transfer, for instance). This provides for the "data channel," which is often termed "in-band," or commands used in the same channel as the data. It simplifies the connectivity. This protocol and methodology facilitates preventive failure analysis and performs actions with storage copy service functions, for example, to mitigate failure scenarios in storage networks. Copy service responses may include creating redundant data copies with point-in-time copies, creating remote copies of data with synchronous copy protection, or manipulating an asynchronous environment to generate a more accurate data set for backup purposes.

The system presents and collects status information, such as path checking for redundancy, machine state, performance tolerance, and copy service states. The system can respond with an action, such as a copy service action, to a system state change. The system can detect and respond to application state changes. The system also includes the ability to auto-discover SAN components, more particularly the initial configuration and population of configuration via automatic discovery. The system may use a default tolerance policy, which is customizable to the unique environment of the system. The policy may also define customizable responses based on the SAN environment variables or specific points of failure. The system also includes the ability to manage an unused storage pool to create redundant data instances for specific points of failure and the ability to recover components into the configuration when they are repaired.

In accordance with one illustrative embodiment, a unique protocol is provided for communicating and responding to conditions in a SAN environment to system state changes. The protocol is a communication method that may use synchronous communications methods to communicate device/application status and to perform administrative actions on storage, network, server, and applications. The protocol supports data collection on multiple transport media, such as, but not limited to, Ethernet, fibre channel, fibre connector (FICON), and application program interface (API). The protocol stores this information locally on each component of the system and propagates any changes in the system state and definitions to all other components via the same protocol.

The protocol may be a lightweight protocol capable of utilizing the redundant components and multiple paths that are typical in a SAN environment. The protocol is independent of the physical network and capable of sending and receiving messages synchronously or asynchronously. The protocol may also be capable of using multiple transport media. The protocol may transport status, configuration commands, and full data of policy behavior to all components of the system. Configuration and policy management may be performed at any point of the system. Changes will propagate to all other components via in-band communications.

Figure 5:
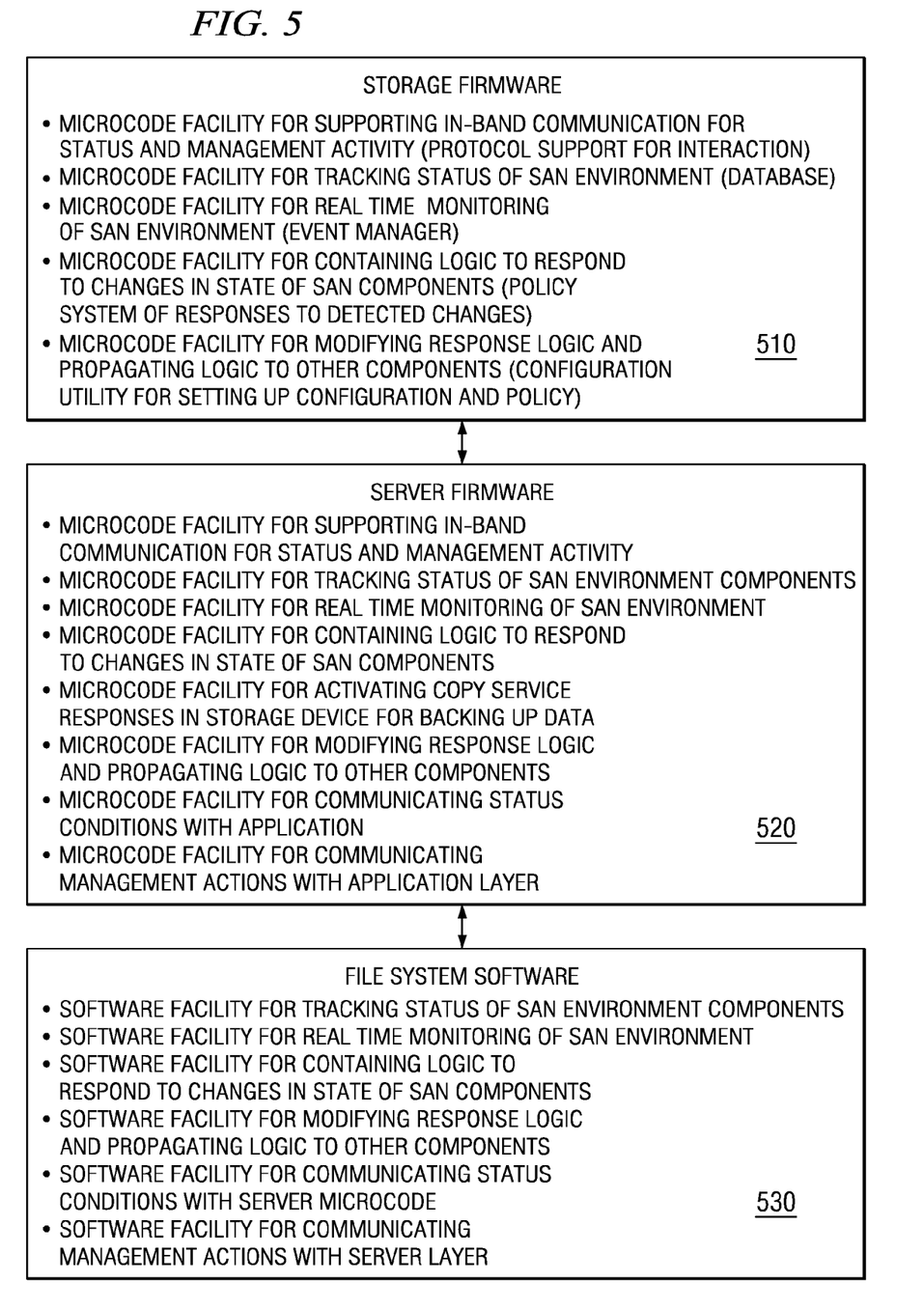
FIG. 5 is a block diagram illustrating an example implementation of a storage network in accordance with an illustrative embodiment.

FIG. 5 is a block diagram illustrating an example implementation of a storage network in accordance with an illustrative embodiment. In the depicted example, the protocol is implemented using microcode in storage firmware 510, server firmware 520, and application software 530.

The implementation to support the protocol in storage firmware 510 includes:

Microcode facility for supporting in-band communication for status and management activity (protocol support for interaction).

Microcode facility for tracking status of SAN environment (database).

Microcode facility for real time monitoring of SAN environment (event manager).

Microcode facility for containing logic to respond to changes in state of SAN components (policy system of responses to detected changes).

Microcode facility for modifying response logic and propagating logic to other components (configuration utility for setting up configuration and policy).

The implementation to support the protocol in server firmware 520 includes:

Microcode facility for supporting in-band communication for status and management activity.

Microcode facility for tracking status of SAN environment components.

Microcode facility for real time monitoring of SAN environment.

Microcode facility for containing logic to respond to changes in state of SAN components.

Microcode facility for activating copy service responses in storage device for backing up data.

Microcode facility for modifying response logic and propagating logic to other components.

Microcode facility for communicating status conditions with application.

Microcode facility for communicating management actions with application layer.

The implementation to support the protocol in file system software 530 includes:

Software facility for tracking status of SAN environment components.

Software facility for real time monitoring of SAN environment.

Software facility for containing logic to respond to changes in state of SAN components.

Software facility for modifying response logic and propagating logic to other components.

Software facility for communicating status conditions with server microcode.

Software facility for communicating management actions with server layer.

In one exemplary scenario, a storage device, server, and database are configured. The storage device reports a degraded condition to the user and to the system. The server responds by quiescing host cache and writing data out to disk. The storage device then responds by creating a valid copy of data via a flash copy utility. The system reports the mitigation activity to the user with time, date, backup copy location, and relevant application data taken at the time of the activity.

In another exemplary scenario, the SAN includes a storage device, redundant servers, and redundant databases. The server reports a degraded path condition that reduces performance. The server responds to the user and to the system that it is taking steps to mitigate the situation. The server quiesces I/O from host cache to disk. The server instructs the storage device to create a redundant copy of data. The server migrates workload to a redundant server. The system reports the mitigation action to the user with time, data, backup copy location, and relevant application data taken at the time of the action.

Figure 6:
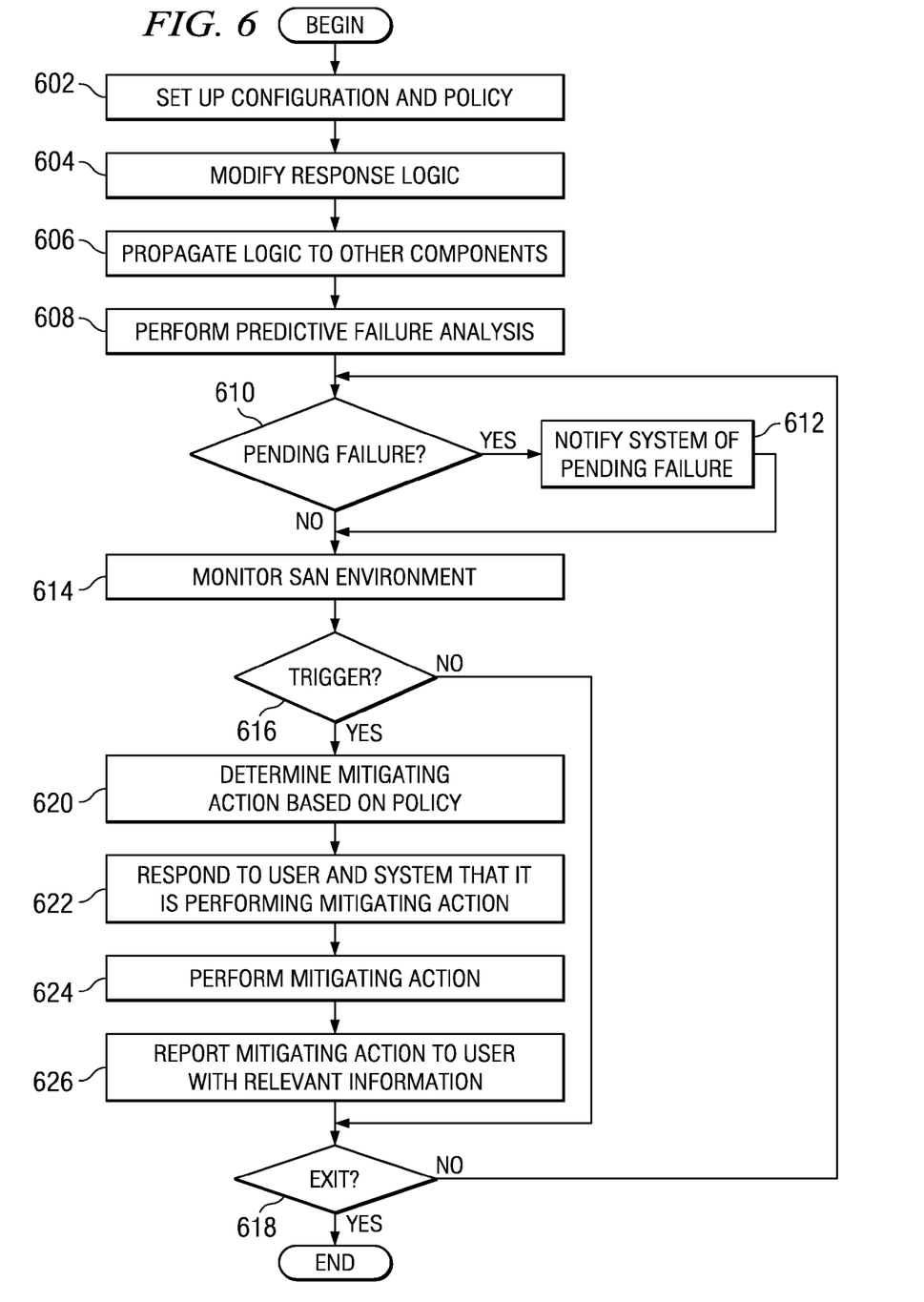
FIG. 6 is a flowchart illustrating operation of a host system to detect pending failures and perform mitigating actions in accordance with an illustrative embodiment.

FIG. 6 is a flowchart illustrating operation of a host system to detect pending failures and perform mitigating actions in accordance with an illustrative embodiment. Operation begins and the host system sets up configuration and policy (block 602). The host system modifies response logic (block 604) and propagates the logic to other components in the system (block 606). The host system then performs predictive failure analysis (block 608).

The host system determines whether a pending failure, or an actual failure, exists (block 610). If a pending failure exists, the host system notifies the other components in the SAN of the pending failure (block 612). The host system may detect a pending failure based on the predictive failure analysis of block 608, for example. Thereafter, or if a pending failure does not exist in block 610, the host system monitors the SAN environment (block 614).

Next, the host system determines whether a status event, such as a pending failure in block 610, triggers an action (block 616). If a status event does not trigger an action, the host system determines whether an exit condition exists (block 618). An exit condition may exist, for example, the host system shuts down. If an exit condition does not exist, operation returns to block 608 to perform predictive failure analysis. If an exit condition does exist in block 618, operation ends.

Returning to block 616, if a status event triggers an action, the host system determines a mitigating action to perform based on a policy (block 620). The host system then responds to the user and the system that it is performing a mitigating action (block 622). The host system performs the mitigating action (block 624) and reports the mitigating action to the user with relevant information (block 626). Thereafter, operation proceeds to block 618 to determine whether an exit condition exists.

In the case of a host system, a mitigating action may include quiescing host cache, disabling write caching on the host itself, forcing volumes to be read-only, forcing a file system into a "safe mode," writing data out to disk, modifying paths used, instructing a storage device to create a redundant copy of data, or migrating workload to a redundant host system. Other mitigating actions may be readily apparent to a person of ordinary skill in the art.

Figure 7:
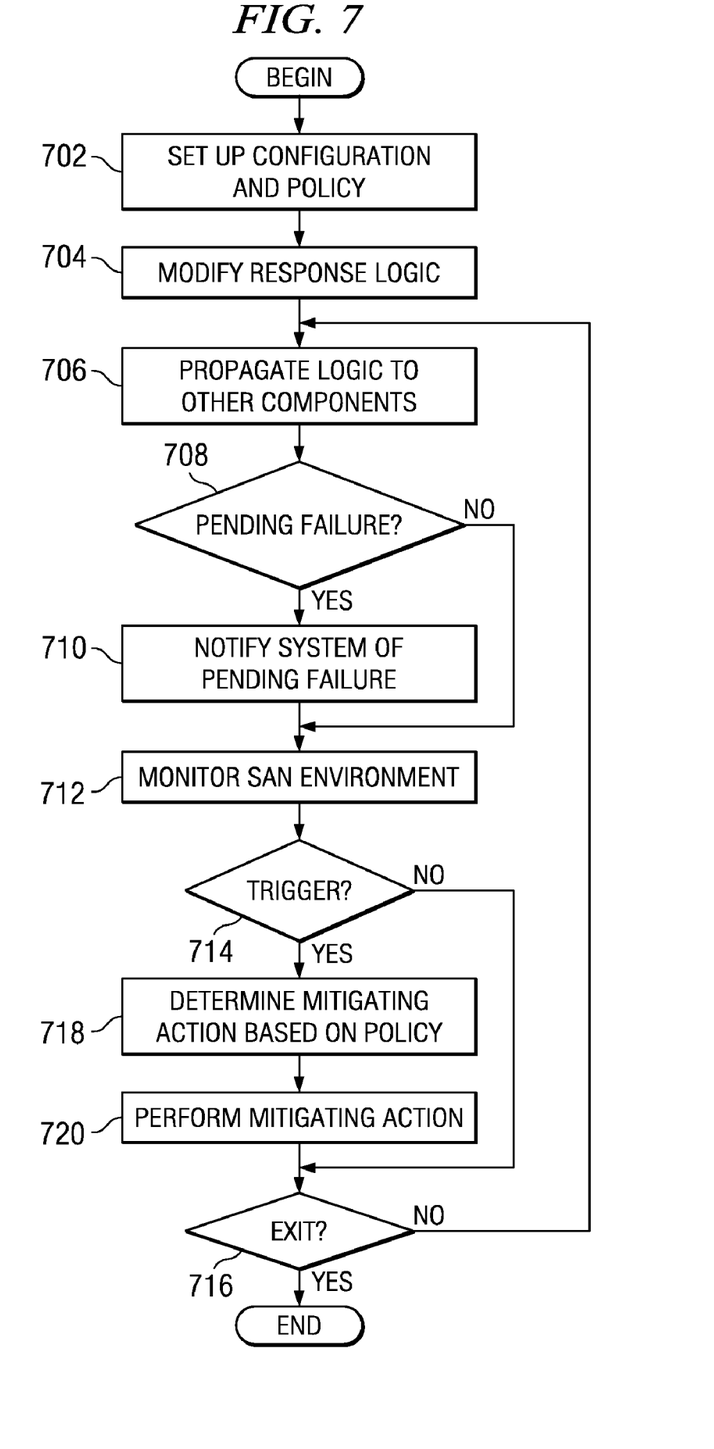
FIG. 7 is a flowchart illustrating operation of a component in a storage area network to detect pending failures and perform mitigating actions in accordance with an illustrative embodiment.

FIG. 7 is a flowchart illustrating operation of a component in a storage area network to detect pending failures and perform mitigating actions in accordance with an illustrative embodiment. The component may be a host application, a storage device, or any other component in the SAN, such as a switch or router. Operation begins and the component sets up configuration and policy (block 702). The component modifies response logic (block 704) and propagates the logic to other components in the system (block 706).

The component determines whether a pending failure, or an actual failure, exists (block 708). If a pending failure exists, the component notifies the other components in the SAN of the pending failure (block 710). Thereafter, or if a pending failure does not exist in block 708, the component monitors the SAN environment (block 712).

Next, the component determines whether a status event, such as a pending failure in block 708, triggers an action (block 714). If a status event does not trigger an action, the component determines whether an exit condition exists (block 716). An exit condition may exist, for example, when the component terminates operation, such as when the component loses power or is shut down. If an exit condition does not exist, operation returns to block 708 to determine whether a pending failure exists. If an exit condition does exist in block 716, operation ends.

Returning to block 714, if a status event triggers an action, the component determines a mitigating action to perform based on a policy (block 718). The component then performs the mitigating action (block 720). Thereafter, operation proceeds to block 716 to determine whether an exit condition exists.

In the case of a storage system, for example, mitigating actions may include forcing an asynchronous peer-to-peer remote copy to create an additional data copy or converting an asynchronous peer-to-peer remote copy to synchronous to reduce data loss. Other mitigating actions may be readily apparent to a person of ordinary skill in the art.

Figure 8:
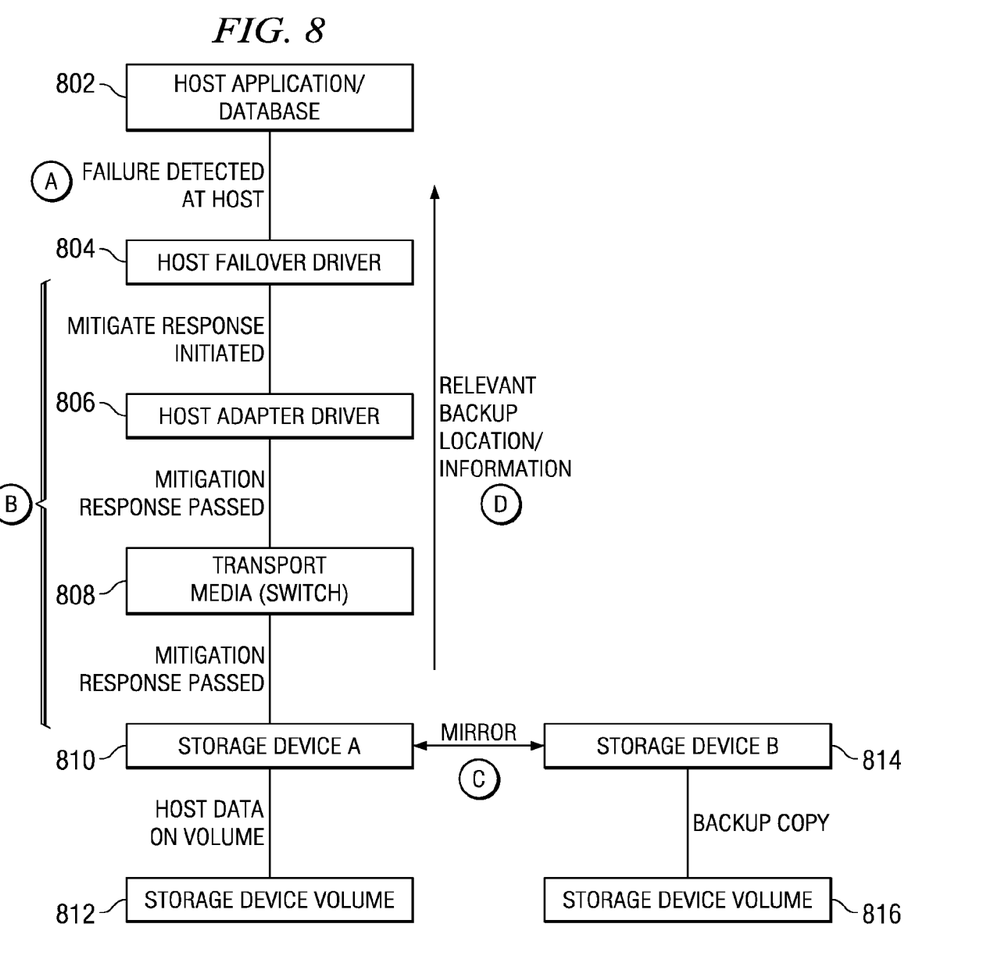
FIG. 8 is an information flow diagram illustrating a peer-to-peer remote copy setup in accordance with an exemplary embodiment.

FIG. 8 is an information flow diagram illustrating a peer-to-peer remote copy setup in accordance with an exemplary embodiment. In step A, host application/database 802 detects a failure at the host. In step B, the response is passed down the stack through host failover driver 804, host adapter driver 806, and transport media (switch) 808, to storage device A 810.

Next, in step C, storage device A 810 initiates an "extra" data copy with peer-to-peer remote copy (PPRC) to backup storage, storage device B 814. In the PPRC, storage device A 810 stores the host data on storage device volume 812, and storage device B 814 stores the backup copy on storage device volume 816. Then, in step D, relevant backup location/information is passed back up the stack to the host.

Figure 9:
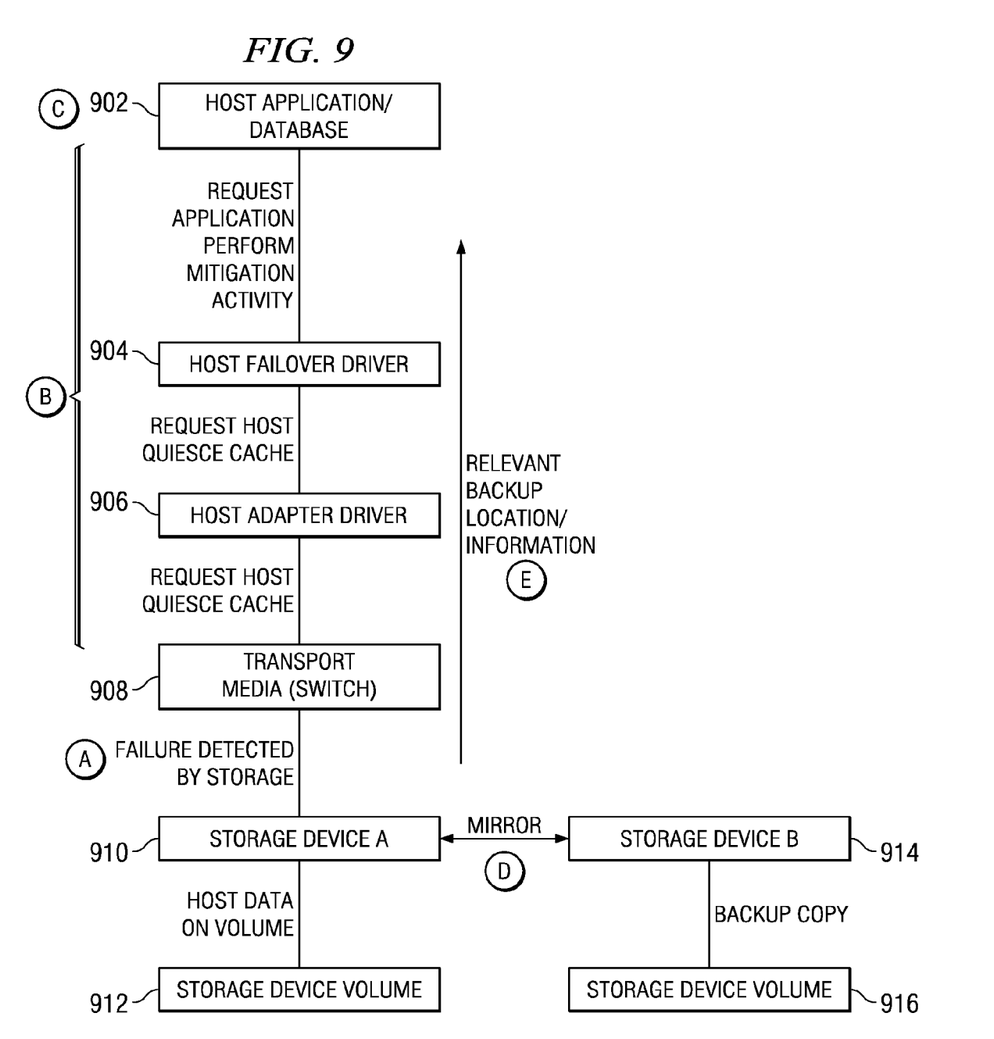
FIG. 9 is an information flow diagram illustrating a peer-to-peer remote copy response to predicted failure in accordance with an exemplary embodiment

FIG. 9 is an information flow diagram illustrating a peer-to-peer remote copy response to predicted failure in accordance with an exemplary embodiment. In step A, a failure or impending failure is detected at storage device A 910. In step B, the mitigation request is passed up the stack through transport media (switch) 908, host adapter driver 906, and host failover driver 904, to host application/database 902 as a request for the application to perform the mitigation activity.

In step C, the host application 902 performs the mitigation activity by quiescing activity out of cache. Further, in step D, storage device A 910 initiates an "extra" data copy with PPRC to backup storage, storage device 914. In the PPRC, storage device A 910 stores the host data on storage device volume 912, and storage device B 914 stores the backup copy on storage device volume 916. Then, in step E, relevant location/information is passed back up the stack to the host.

Thus, the illustrative embodiments solve the disadvantages of the prior art by providing a unique protocol for communicating and responding to conditions in a SAN environment to system state changes. A common interface and communication methodology are provided for interaction between the components of a storage area network for them to activate "triggers" that cause actions to be taken by the devices to utilize copy service functions to create additional copies of data, and to potentially route load to other resources. The actions can be taken by any of the elements of the storage area network to mitigate the impact of the pending failure.

The advantage of this system over current methods is that it can detect both failure and impending failure in any component in the system and use resources in any other component to mitigate the failure. This creates a much more comprehensive recovery strategy and the potential to save more data than in current systems. Furthermore, if a layer is missing support, then the system may compensate. For example, if a file system or a particular storage device does not support preemptive data protection, the system It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer recordable medium having a computer readable program, wherein the computer readable program, when executed within a first component within a plurality of components of a storage area network, causes the first component to:
   receive a status message from a second component within the plurality of components of the storage area network through a plurality of levels of the storage area network, wherein the status message reports a pending failure;
   responsive to receiving the status message at the first component, determine a mitigating action to be performed by the first component;
   perform the mitigating action at the first component;
   report the mitigating action to the plurality of components; and
   report the mitigating activity to a user with relevant information, wherein the mitigating action comprises a peer-to-peer remote copy and wherein the relevant information comprises time, date, and backup copy location.

2. The computer program product of claim 1, wherein the computer readable program causes the first component to perform predictive failure analysis and responsive to detecting a pending failure in the first component, send a second status message from the first component to one or more of the plurality of other components through a plurality of levels of the storage area network, wherein the second status message reports the pending failure.

3. The computer program product of claim 2, wherein sending the second status message from the first component to at least one or more of the plurality of other components in the storage area network comprises passing the second status message through one or more intermediate components in the storage area network.

4. The computer program product of claim 1, wherein the first component is a host system and wherein the mitigating action comprises flushing cache, disabling write caching, forcing volumes read-only, forcing a file system into a safe mode, or beginning a failover to a redundant host system.

5. The computer program product of claim 1, wherein the first component is a storage device and wherein the mitigating action comprises forcing the peer-to-peer remote copy as an asynchronous peer-to-peer remote copy or converting the peer-to-peer remote copy from an asynchronous peer-to-peer remote copy to a synchronous peer-to-peer remote copy.

6. An apparatus in a first component within a plurality of components of a storage area network, comprising:
   a processor; and
   a memory coupled to the processor, wherein the memory contains instructions which, when executed by the processor, cause the processor to:
      receive a status message from a second component within the plurality of components of the storage area network through a plurality of levels of the storage area network, wherein the status message reports the pending failure;
      responsive to receiving the status message at the first component, determine a mitigating action to be performed by the first component; and
      perform the mitigating action at the first component,
      wherein the first component is a storage device component and wherein the mitigating action comprises forcing an asynchronous peer-to-peer remote copy or converting an asynchronous peer-to-peer remote copy to synchronous.

7. The apparatus of claim 6, wherein the first component is a host system component and wherein the mitigating action comprises flushing cache, disabling write caching, forcing volumes read-only, forcing a file system into a safe mode, or beginning a failover to a redundant host system.

8. A method for detecting pending failures and performing mitigating actions a first component within a plurality of components of a storage area network, the method comprising:
   receiving a status message from a second component within the plurality of components of the storage area network through a plurality of levels of the storage area network, wherein the status message reports the pending failure;
   responsive to receiving the status message at the first component, determining a mitigating action to be performed by the first component;
   performing the mitigating action at the first component
   reporting the mitigating action to a user with relevant information, wherein the mitigating action comprises a peer-to-peer remote copy and wherein the relevant information comprises time, date, and backup copy location.

9. The method of claim 8, further comprising:
   performing predictive failure analysis; and
   responsive to detecting a pending failure in the first component, sending a second status message from the first component to one or more of the plurality of other components through a plurality of levels of the storage area network, wherein the second status message reports the pending failure.

10. The method of claim 9, wherein sending the second status message from the first component to at least one or more of the plurality of other components in the storage area network comprises passing the second status message through one or more intermediate components in the storage area network.

11. The method of claim 8, wherein the first component is a host system and wherein the mitigating action comprises flushing cache, disabling write caching, forcing volumes read-only, forcing a file system into a safe mode, or beginning a failover to a redundant host system.

12. The method of claim 8, wherein the first component is a storage device and wherein the mitigating action comprises forcing an asynchronous peer-to-peer remote copy or converting an asynchronous peer-to-peer remote copy to synchronous.

13. The method of claim 8, further comprising:
reporting the mitigating activity to the plurality of components.

14. A method for providing a data protection and copy service in a storage area network, the method comprising:
configuring a first component within a plurality of components of the storage area network to detect a pending failure in the first component and to send a first status message from the first component to one or more of the plurality of other components through a plurality of levels of the storage area network, wherein the first status message reports the pending failure;
configuring the first component to determine a mitigating action to be performed by the first component responsive to receiving a second status message from a second component within the plurality of components of the storage area network, to perform the mitigating action at the first component, and to report the mitigating action to the plurality of components; and
report the mitigating activity to a user with relevant information, wherein the mitigating action comprises a peer-to-peer remote copy and wherein the relevant information comprises time, date, and backup copy location.

15. The apparatus of claim 6, wherein the instructions which further cause the processor to:
report the mitigating activity to the plurality of components.

16. The apparatus of claim 6, wherein the instructions which further cause the processor to:
report the mitigating activity to a user with relevant information, wherein the mitigating action comprises a peer-to-peer remote copy and wherein the relevant information comprises time, date, and backup copy location.

17. The method of claim 14, wherein the first component is a storage device and wherein the mitigating action comprises forcing the peer-to-peer remote copy as an asynchronous peer-to-peer remote copy or converting the peer-to-peer remote copy from an asynchronous peer-to-peer remote copy to a synchronous peer-to-peer remote cony.

* * * * *